US012799007B2

(12) United States Patent
Li et al.

(10) Patent No.: US 12,799,007 B2
(45) Date of Patent: Nov. 17, 2026

(54) MUNICIPAL SEWAGE NITROGEN REMOVAL TREATMENT DEVICE AND METHOD

(71) Applicant: SUZHOU UNIVERSITY OF SCIENCE AND TECHNOLOGY, Suzhou (CN)

(72) Inventors: Xiang Li, Suzhou (CN); Yong Huang, Suzhou (CN); Yan Yuan, Suzhou (CN)

(73) Assignee: SUZHOU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 353 days.

(21) Appl. No.: 18/252,476

(22) PCT Filed: Jul. 4, 2022

(86) PCT No.: PCT/CN2022/103534

§ 371 (c)(1),
(2) Date: Apr. 12, 2024

(87) PCT Pub. No.: WO2023/123989

PCT Pub. Date: Jul. 6, 2023

(65) Prior Publication Data

US 2024/0336505 A1 Oct. 10, 2024

(30) Foreign Application Priority Data

Dec. 29, 2021 (CN) ......................... 202111638780.9

(51) Int. Cl.
*C02F 3/12* (2023.01)
*C02F 3/14* (2023.01)
(Continued)

(52) U.S. Cl.
CPC .............. *C02F 3/1236* (2013.01); *C02F 3/14* (2013.01); *C02F 3/303* (2013.01); *C02F 3/307* (2013.01);
(Continued)

(58) Field of Classification Search
CPC .. C02F 3/1236; C02F 3/06; C02F 3/14; C02F 3/303; C02F 3/307; B01D 21/0051
(Continued)

(56) References Cited

U.S. PATENT DOCUMENTS 5,545,327 A * 8/1996 Volland ..................... C02F 3/06
210/615

FOREIGN PATENT DOCUMENTS

CA 2542894 A1 10/2007
CN 103086507 A * 5/2013
(Continued)

OTHER PUBLICATIONS

Zheng et al, CN 103265144 English machine translation, pp. 1-8 (Year: 2013).*
(Continued)

*Primary Examiner* — Claire A Norris
(74) *Attorney, Agent, or Firm* — Tutunjian & Bitetto, P.C.

(57) ABSTRACT

Disclosed is a municipal sewage nitrogen removal treatment device, comprising a reaction pool. A water inlet pipeline, a water outlet pipeline and a reflux pipeline are connected to the reaction pool, and the reflux pipeline communicates with the water inlet pipeline by using a reflux element. A surface aerator is arranged in the reaction pool. The reaction pool comprises a reaction zone and a settling zone, the settling zone is located at the bottom of the reaction zone, and the reaction zone is provided with a flow deflector. The flow deflector is provided with a plurality of flow deflecting channels, the sidewall of the flow deflecting channel is a
(Continued)

rough surface, and microorganisms in the reaction pool are able to attach to the sidewall of the flow deflecting channel. The present disclosure further provides a treatment method using the municipal sewage nitrogen removal treatment device above.

20 Claims, 1 Drawing Sheet

(51) Int. Cl.
*C02F 3/30* (2023.01)
*C02F 101/16* (2006.01)

(52) U.S. Cl.
CPC .... *C02F 2101/16* (2013.01); *C02F 2203/006* (2013.01); *C02F 2301/046* (2013.01)

(58) Field of Classification Search
USPC .......................................................... 210/615
See application file for complete search history.

(56) References Cited

FOREIGN PATENT DOCUMENTS

| | | | | |
|---|---|---|---|---|
| CN | 103265144 | A | * | 8/2013 |
| CN | 105254011 | A | | 1/2016 |
| CN | 107381808 | A | | 11/2017 |
| CN | 207418387 | U | * | 5/2018 |
| CN | 215886698 | U | | 2/2022 |
| CN | 114291893 | A | | 4/2022 |

OTHER PUBLICATIONS

Yan et al, CN 207418387 English machine translation, pp. 1-7 (Year: 2018).*
Zou et al, CN 103086507 English machine translation, pp. 1-6 (Year: 2013).*
CNIPA Office Action, App. No. 202111638780.9, Nov. 17, 2022.

* cited by examiner

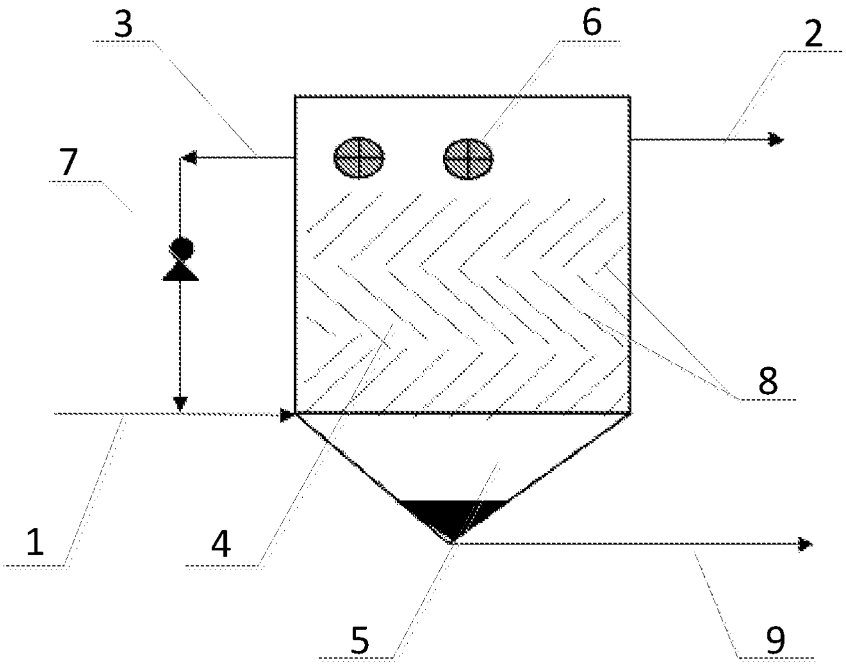
3
6
2
7
8
1
4
5
9

MUNICIPAL SEWAGE NITROGEN REMOVAL TREATMENT DEVICE AND METHOD

CROSS-REFERENCE TO RELATED APPLICATION

This patent application is a national stage application of International Patent Application No. PCT/CN2022/103534, filed on Jul. 4, 2022, which claims the benefit and priority of Chinese Patent Application No. 202111638780.9, filed with the China National Intellectual Property Administration on Dec. 29, 2021, the disclosure of which is incorporated by reference herein in its entirety as part of the present application.

TECHNICAL FIELD

The present disclosure relates to the technical field of sewage treatment, and in particular relates to a municipal sewage nitrogen removal treatment device and method.

BACKGROUND

Nitrification and denitrification, as a common process for municipal wastewater nitrogen removal, has been developed for more than half a century. However, due to the large demand of organic matters, high sludge yield, as well as high power consumption caused by high aeration rate, it is difficult to meet the concept of "peak carbon dioxide emissions and carbon neutrality".

Compared with the traditional nitrogen removal technology, the partial nitritation-anammox process has attracted wide attention due to its capability of reducing the oxygen demand by 60%, saving the organic carbon by 100% and reducing the excess sludge by 80%, as well as high nitrogen removal efficiency. The so-called partial nitritation-anammox process refers to the process in which about half of the ammonia in the wastewater is converted into nitrite by anammox bacteria, and the remaining ammonia and nitrite are converted to nitrogen by anammox bacteria. At present, partial nitritation-anammox process has been applied to nitrogen removal treatment of high ammonia industrial wastewater, such as waste leachate, sludge digestate, etc. Such wastewater can be discharged into the sewage network as long as the ammonia nitrogen after treatment is lower than 25 mg/L, it shows great superiority. How to treat the sewage by turning waste into treasure and achieve the recovery of matters in sewage by resource and energy has become an important hot spot at the forefront of water treatment. In this context, the technology to recover organic matters and phosphorus from wastewater has gradually matured and many demonstration projects have been carried out. However, the treatment of the remaining nitrogen in wastewater is a major challenge.

The use of partial nitritation-anammox as a part of nitrogen treatment in municipal wastewater has become an essential part of the current overall technology. However, the low concentration of ammonia nitrogen in municipal wastewater (<70 mg/L), the huge volume of water, the seasonal fluctuations in temperature and strict emission targets (ammonia nitrogen below 5 mg/L and total nitrogen below 10 mg/L) have led to a large increase of nitrobacteria in the nitritation process. While in the nitritation process of the high ammonia wastewater, the strategy of inhibiting nitrobacteria by using high free ammonia, free nitrous acid, high temperature and other strategies is hard to be used in low ammonia municipal wastewater environment. How to achieve stable nitritation and efficient accumulation of nitrite in a low-temperature and low-ammonia environment has become the bottleneck of applying the technology to the mainstream nitrogen removal of municipal sewage. Currently, researchers have also developed a variety of methods to inhibit nitrobacteria under mainstream conditions (pharmaceuticals, low-oxygen control, etc.), but the material consumption is high and the control process is complex, and easy-to-operate strategies such as so-called low-oxygen intermittent aeration still suffer from many instabilities.

Therefore, how to change the current situations of complex inhibition of nitrobacteria in partial nitritation treatment of municipal sewage with low-concentration ammonia nitrogen and increased material consumption of nitrogen treatment in municipal sewage in the prior art has become an urgent problem to be solved by those skilled in the art.

SUMMARY

An objective of the present disclosure is to provide a municipal sewage nitrogen removal treatment device and method to solve the problems in the prior art. The working efficiency of nitrogen treatment in municipal sewage is improved, and the material consumption of nitrogen removal treatment is reduced.

To achieve the objective above, the present disclosure provides the following solutions: a municipal sewage nitrogen removal treatment device includes a reaction pool. A water inlet pipeline, a water outlet pipeline and a reflux pipeline are connected to the reaction pool. The water inlet pipeline, the water outlet pipeline and the reflux pipeline respectively communicate with an inner cavity of the reaction pool, and the reflux pipeline communicates with the water inlet pipeline by using a reflux element.

A surface aerator is arranged in the reaction pool, which can provide dissolved oxygen and can be configured to enhance liquid stirring. The reaction pool includes a reaction zone and a settling zone, the settling zone is located at the bottom of the reaction zone, and the reaction zone is provided with a flow deflector. The flow deflector is provided with a plurality of flow deflecting channels, and each of the flow deflecting channels is provided with at least one bend portion capable of changing a flowing direction of sewage. The reaction zone communicates with the settling zone by using the flow deflecting channels, the sidewall of the flow deflecting channel is a rough surface, and microorganisms in the reaction pool can attach to the sidewall of the flow deflecting channel.

Preferably, the water inlet pipeline communicates with the bottom of the reaction zone, and the communicating position of the water inlet pipeline and the reaction pool is located at the bottom of the flow deflector. The water inlet pipeline extends into the reaction pool, and the part, extending into the reaction pool, of the water inlet pipeline is a perforated pipe. The communicating position of the water outlet pipeline and the reaction zone is located at the top of the flow deflector. The water inlet pipeline and the water outlet pipeline are respectively connected to the sidewall of the reaction pool, and the water inlet pipeline and the water outlet pipeline are respectively located on two opposite sides of the reaction pool.

Preferably, the communicating position of the reflux pipeline and the reaction zone is located at the top of the flow deflector, and the reflux element is a reflux pump.

Preferably, the settling zone is of a tapered structure, the end with larger cross section area of the settling zone communicates with the reaction zone, and a sludge discharge pipeline is connected to the bottom of the settling zone.

Preferably, the flow deflector includes a plurality of inclined pipes which are connected and arranged in parallel. At least two groups of flow deflectors are superposed, and two groups of inclined pipes have different inclination directions, and inner cavities of the inclined pipes of the adjacent groups of flow deflectors are in communication to form the flow deflecting channel.

Preferably, there are three groups of flow deflectors. The inclined pipe at the bottom is obliquely arranged towards a direction of the water inlet pipeline, and the inclined pipe at the top is obliquely arranged towards a direction of the water outlet pipeline.

Preferably, the radial section of the inclined pipe is a polygon, and an included angle between the axis of the inclined pipe and the horizontal plane is 30° to 60°.

The present disclosure further provides a municipal sewage nitrogen removal treatment method using the municipal sewage nitrogen removal treatment device above. The method includes the steps as follows: starting nitritation relying on original microorganisms in the wastewater to make the microorganisms attach to the flow deflecting channels and grow therein; and inoculating anammox sludge to start anammox. The inoculation rate of the anammox sludge is that the concentration of suspended sludge reaches 50 mg/L to 100 mg/L, and the dissolved oxygen content is 0.1 mg/L to 0.2 mg/L.

Preferably, when the sludge concentration is higher than 100 mg/L, the quantity of reflux of the reflux pipeline is reduced, or the reflux pipeline stops working, and the sludge settles in the settling zone and is discharged.

Preferably, when the increase of nitrobacteria leads to destabilization of the nitritation process, the quantity of reflux of the reflux pipeline is increased, the microorganisms adsorbed to the flow deflecting channels are shed off, and the quantity of reflux is reduced to make the suspended sludge settle.

Compared with the prior art, the present disclosure has the following technical effects: the municipal sewage nitrogen removal treatment device includes a reaction pool. A water inlet pipeline, a water outlet pipeline and a reflux pipeline are connected to the reaction pool. The water inlet pipeline, the water outlet pipeline and the reflux pipeline respectively communicate with an inner cavity of the reaction pool, and the reflux pipeline communicates with the water inlet pipeline by using a reflux element. A surface aerator is arranged in the reaction pool, which can provide dissolved oxygen and can be configured to enhance liquid stirring. The reaction pool includes a reaction zone and a settling zone. The settling zone is located at the bottom of the reaction zone, and the reaction zone is provided with a flow deflector. The flow deflector is provided with a plurality of flow deflecting channels, and each of the flow deflecting channels is provided with at least one bend portion capable of changing a flowing direction of sewage. The reaction zone communicates with the settling zone by using the flow deflecting channels, the sidewall of the flow deflecting channel is a rough surface, and microorganisms in the reaction pool can attach to the sidewall of the flow deflecting channel.

By using the municipal sewage nitrogen removal treatment device of the present disclosure, only the original microorganisms in wastewater are used to start nitritation, and then a small amount of anammox sludge is inoculated to start anammox, all microorganisms are adsorbed on the inner wall of the flow deflecting channels to grow, thus keeping the concentration of suspended sludge in water below 100 mg/L; and a partial nitritation-anammox system is started by using a strategy of ultra-low microbial biomass and ultra-high functional microorganism abundance. In the prior art, the large amount of sludge requires large aeration for sludge stirring, and the bottom aeration mode which is mostly adopted leads to unstable control of the low oxygen environment; moreover, the water in the pool needs to be drained during bottom maintenance, leading to large operation difficulty. Different from the prior art, there is basically no sludge, it is unnecessary to provide a bottom aerator, and the surface aerator is used to achieve surface aeration; and meanwhile, the dissolved oxygen in the reaction pool is controlled by using the reflux pipeline, the stability of the dissolved oxygen is enhanced, and the increase of nitrobacteria caused by excessive dissolved oxygen is avoided. Meanwhile, the settlement and removal of the sludge can be achieved by adjusting the flow rate of the reflux pipeline to be matched with the flow deflecting channel, the subsequent sludge pool is simplified, and the working efficiency of sewage nitrogen removal treatment is improved. In accordance with the municipal sewage nitrogen removal treatment device, the bottom of the reaction pool is provided with the settling zone to facilitate the direct settlement of the sludge. On the one hand, the sludge at the upper reaction pool is guaranteed at a low concentration; on the other hand, NOB in the membrane grown by adsorption in the reaction pool is eluted out of the reaction pool by a high flow rate and discharged from the bottom to ensure the nitritation effect at the upper part.

The present disclosure further provides a treatment method using the municipal sewage nitrogen removal treatment device above. Nitritation is started relying on the original microorganisms in the wastewater to make the microorganisms attach to the flow deflecting channels and grow therein; and anammox sludge is inoculated to start anammox, wherein the inoculation rate of the anammox sludge is that the concentration of suspended sludge reaches 50 mg/L to 100 mg/L, and the dissolved oxygen content is 0.1 mg/L to 0.2 mg/L. In accordance with the municipal sewage nitrogen removal treatment method provided by the present disclosure, the mode of high sludge amount, bottom aeration and rear sedimentation pool is employed for sewage treatment in the prior art is achieved, the autotrophic biological nitrogen removal of the municipal sewage is achieved, and the material consumption of nitrogen removal treatment is reduced.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

FIG. 1 is a structure diagram of a municipal sewage nitrogen removal treatment device in accordance with the present disclosure.

In the drawings: 1—water inlet pipeline; 2—water outlet pipeline; 3—reflux pipeline; 4—reaction zone; 5—settling zone; 6—surface aerator; 7—reflux element; 8—inclined pipe; 9—sludge discharge pipeline.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a municipal sewage nitrogen removal treatment device and method to solve the problems in the prior art. The working efficiency of nitrogen treatment in municipal sewage is improved, and the material consumption of nitrogen removal treatment is reduced.

To make the objectives, features and advantages of the present disclosure more apparently and understandably, the following further describes the present disclosure in detail with reference to the accompanying drawings and the specific embodiments.

FIG. 1 is a structure diagram of a municipal sewage nitrogen removal treatment device in accordance with the present disclosure.

The present disclosure provides a municipal sewage nitrogen removal treatment device. The device includes a reaction pool. A water inlet pipeline 1, a water outlet pipeline 2 and a reflux pipeline 3 are connected to the reaction pool. The water inlet pipeline 1, the water outlet pipeline 2 and the reflux pipeline 3 respectively communicate with an inner cavity of the reaction pool, and the reflux pipeline 3 communicates with the water inlet pipeline 1 by using a reflux element 7. A surface aerator 6 is arranged in the reaction pool, the surface aerator 6 is floated on the water surface of the reaction zone 4, and a plurality of surface aerators 6 are uniformly spaced from each other when there are a plurality of surface aerators. The surface aerator 6 can provide dissolved oxygen and can be configured to enhance liquid stirring. The reaction pool includes a reaction zone 4 and a settling zone 5. The settling zone 5 is located at the bottom of the reaction zone 4, and the reaction zone 4 is provided with a flow deflector. The flow deflector is provided with a plurality of flow deflecting channels, and each of the flow deflecting channels is provided with at least one bend portion capable of changing a flowing direction of sewage. The reaction zone 4 communicates with the settling zone 5 by using the flow deflecting channels, the sidewall of each flow deflecting channel is a rough surface, and microorganisms in the reaction pool can attach to the sidewall of the flow deflecting channel. It needs to be noted that the surface roughness value of the side wall of the flow deflecting channel is large to facilitate the attachment of the microorganisms.

By using the municipal sewage nitrogen removal treatment device of the present disclosure, only the original microorganisms in the wastewater are used to start nitritation, and then a small amount of anammox sludge is inoculated to start anammox, all microorganisms are adsorbed on the inner wall of the flow deflecting channels to grow, thus keeping the concentration of suspended sludge in water below 100 mg/L; and a partial nitritation-anammox system is started by using the strategy of ultra-low microbial biomass and ultra-high functional microorganism abundance. Different from the prior art, no bottom aerator is provided in the present disclosure, and the surface aerator 6 is used to achieve surface aeration; meanwhile, the dissolved oxygen in the reaction pool is controlled by using the reflux pipeline 3, the stability of the dissolved oxygen is enhanced, and the increase of nitrobacteria caused by excessive dissolved oxygen is avoided. Meanwhile, the settlement and removal of the sludge can be achieved by adjusting the flow rate of the reflux pipeline 3 to be matched with the flow deflecting channel, the subsequent sludge pool is simplified, and the working efficiency of sewage nitrogen removal treatment is improved.

In the specific embodiment, the water inlet pipeline 1 communicates with the bottom of the reaction zone 4, the communicating position of the water inlet pipeline 1 and the reaction pool 4 is located at the bottom of the flow deflector. The water inlet pipeline 1 extends into the reaction pool, and the part, extending into the reaction pool, of the water inlet pipeline 1 is a perforated pipe, so that the water may enter each flow deflecting channel of the flow deflector. The communicating position of the water outlet pipeline 2 and the reaction zone 4 is located at the top of the flow deflector. The water inlet pipeline 1 and the water outlet pipeline 2 are respectively connected to the sidewall of the reaction pool, and the water inlet pipeline 1 and the water outlet pipeline 2 are respectively located on two opposite sides of the reaction pool. The water inlet pipeline 1 and the water outlet pipeline 2 are located at both ends of the reaction zone 4 and away from each other, thus making the sewage perform sufficiently reaction in the reaction zone 4.

In addition, the communicating position of the reflux pipeline 3 and the reaction zone 4 is located at the top of the flow deflector, the reflux element 7 is a reflux pump, and the reflux pump allows the water to enter the water inlet pipeline 1 smoothly and then to enter the reaction zone 4. In other embodiments of the present disclosure, the reflux element 7 may also be a mechanical reflux component and other structures allowing the water in the reflux pipeline 3 to flow back to the water inlet pipeline 1.

Specifically, the settling zone 5 is of a tapered structure, the end with larger cross section area of the settling zone 5 communicates with the reaction zone 4 to facilitate the settlement of the sludge. A sludge discharge pipeline 9 is connected to the bottom of the settling zone 5, thus facilitating the settled sludge to be discharged from the sludge discharge pipeline 9.

More specifically, the flow deflector includes a plurality of inclined pipes 8 which are connected and arranged in parallel. At least two groups of flow deflectors are superposed and two groups of inclined pipes 8 have different inclination directions, and inner cavities of the inclined pipes 8 of the adjacent groups of flow deflectors are in communication to form the flow deflecting channel. The flow deflector may employ a plate with inclined pipes 8, and the specific surface area of the plate is 200 $m^2/g$ to 1,000 $m^2/g$.

In a specific embodiment, there are three groups of flow deflectors, and three groups of plates with inclined pipes 8 are adopted. The inclined pipe 8 at the bottom is obliquely arranged towards a direction of the water inlet pipeline 1, and the inclined pipe 8 at the top is obliquely arranged towards a direction of the water outlet pipeline 2.

In addition, the radial section of the inclined pipe 8 is a polygon and can be selected according to actual production needs. The inner diameter of the inclined pipe 8 is 100 mm to 5,000 mm, the flow velocity in the pipe is less than 1 m/s, and an included angle between the axis of the inclined pipe 8 and the horizontal plane is 30° to 60°.

Further, the present disclosure further provides a treatment method using the municipal sewage nitrogen removal treatment device above. Nitritation is started relying on the original microorganisms in the wastewater to make the microorganisms attached to the flow deflecting channels and grow therein; and anammox sludge is inoculated to start anammox. The inoculation rate of the anammox sludge is that the concentration of suspended sludge reaches 50 mg/L to 100 mg/L, and the dissolved oxygen content is 0.1 mg/L to 0.2 mg/L.

When the sludge concentration is higher than 100 mg/L, the quantity of reflux of the reflux pipeline 3 is reduced, or the reflux pipeline stops working, and the sludge settles in the settling zone 5 and is discharged.

It should be emphasized that when the increase of nitrobacteria leads to destabilization of the nitrification process, the quantity of reflux of the reflux pipeline 3 is increased, the microorganisms adsorbed to the flow deflecting channel are shed off, and the quantity of reflux is reduced to allow the suspended sludge to settle, thus achieving the elution of the nitrobacteria.

In accordance with the municipal sewage nitrogen removal treatment method provided by the present disclosure, the mode of high sludge amount (the inoculation rate of the sludge is up to 1,000 to 5,000 mg/L in the prior art), bottom aeration and rear sedimentation pool is employed for sewage treatment in the prior art is achieved, the autotrophic biological nitrogen removal of the municipal sewage is achieved, and the material consumption of nitrogen removal treatment is reduced. The municipal sewage nitrogen removal treatment method of the present disclosure is simple in structure and capable of achieving municipal wastewater autotrophic nitrogen removal in cooperation with a unique starting method.

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A municipal sewage nitrogen removal treatment device, comprising a reaction pool, wherein a water inlet pipeline, a water outlet pipeline and a reflux pipeline are connected to the reaction pool; the water inlet pipeline, the water outlet pipeline and the reflux pipeline respectively communicate with an inner cavity of the reaction pool, and the reflux pipeline communicates with the water inlet pipeline by using a reflux element;

a surface aerator is arranged in the reaction pool; the surface aerator is able to provide dissolved oxygen and configured to enhance liquid stirring; the reaction pool includes a reaction zone and a settling zone; the settling zone is located at the bottom of the reaction zone, and the reaction zone is provided with a flow deflector; the flow deflector is provided with a plurality of flow deflecting channels, and each of the flow deflecting channels is provided with at least one bend portion capable of changing a flowing direction of sewage; the reaction zone communicates with the settling zone by using the flow deflecting channels, the sidewall of each flow deflecting channel is a surface configured to enable microorganisms in the reaction pool to attach to the sidewall of the flow deflecting channel, and microorganism in the reaction pool are able to attach to the sidewall of the flow deflecting channel;

wherein the reaction pool comprises suspended sludge with concentration of 50 mg/L to 100 mg/L.

2. The municipal sewage nitrogen removal treatment device according to claim 1, wherein the water inlet pipeline communicates with the bottom of the reaction zone, the communicating position of the water inlet pipeline and the reaction pool is located at the bottom of the flow deflector; the water inlet pipeline extends into the reaction pool, and the part, extending into the reaction pool, of the water inlet pipeline is a perforated pipe; the communicating position of the water outlet pipeline and the reaction zone is located at the top of the flow deflector; the water inlet pipeline and the water outlet pipeline are respectively connected to the sidewall of the reaction pool, and the water inlet pipeline and the water outlet pipeline are respectively located on two opposite sides of the reaction pool.

3. The municipal sewage nitrogen removal treatment device according to claim 1, wherein the communicating position of the reflux pipeline and the reaction zone is located at the top of the flow deflector, and the reflux element is a reflux pump.

4. The municipal sewage nitrogen removal treatment device according to claim 1, wherein the settling zone is of a tapered structure, the end with larger cross section area of the settling zone communicates with the reaction zone, and a sludge discharge pipeline is connected to the bottom of the settling zone.

5. The municipal sewage nitrogen removal treatment device according to claim 1, wherein the flow deflector comprises a plurality of inclined pipes which are connected and arranged in parallel; the flow deflector comprises at least two groups of flow deflectors which are superposed, and the inclined pipes of the at least two groups of flow deflectors have different inclination directions; and inner cavities of the inclined pipes of adjacent groups of the at least two groups of flow deflectors are in communication to form the flow deflecting channel.

6. The municipal sewage nitrogen removal treatment device according to claim 5, wherein the flow deflector comprises three groups of flow deflector; the inclined pipe at the bottom is obliquely arranged towards the direction of the water inlet pipeline, and the inclined pipe at the top is obliquely arranged towards the direction of the water outlet pipeline.

7. The municipal sewage nitrogen removal treatment device according to claim 5, wherein the radial section of the inclined pipe is a polygon, and an included angle between the axis of the inclined pipe and the horizontal plane is 30° to 60°.

8. A municipal sewage nitrogen removal treatment method using the municipal sewage nitrogen removal treatment device according to claim 1, wherein the method comprises the steps as follows: starting nitritation relying on original microorganisms in the wastewater to make the microorganisms attach to the flow deflecting channels and grow therein; and inoculating anammox sludge to start anammox, and stopping inoculating the anammox sludge until the concentration of any suspended sludge in the reaction pool reaches 50 mg/L to 100 mg/L, and the dissolved oxygen content is 0.1 mg/L to 0.2 mg/L.

9. The municipal sewage nitrogen removal treatment method according to claim 8, wherein the water inlet pipeline communicates with the bottom of the reaction zone, the communicating position of the water inlet pipeline and the reaction pool is located at the bottom of the flow deflector; the water inlet pipeline extends into the reaction pool, and the part, extending into the reaction pool, of the water inlet pipeline is a perforated pipe; the communicating position of the water outlet pipeline and the reaction zone is located at the top of the flow deflector; the water inlet pipeline and the water outlet pipeline are respectively connected to the sidewall of the reaction pool, and the water inlet pipeline and the water outlet pipeline are respectively located on two opposite sides of the reaction pool.

10. The municipal sewage nitrogen removal treatment method according to claim 8, wherein the communicating position of the reflux pipeline and the reaction zone is located at the top of the flow deflector, and the reflux element is a reflux pump.

11. The municipal sewage nitrogen removal treatment method according to claim 8, wherein the settling zone is of a tapered structure, the end with larger cross section area of the settling zone communicates with the reaction zone, and a sludge discharge pipeline is connected to the bottom of the settling zone.

12. The municipal sewage nitrogen removal treatment method according to claim 8, wherein the flow deflector comprises a plurality of inclined pipes which are connected and arranged in parallel; the flow deflect comprises at least two groups of flow deflectors which are superposed, and the inclined pipes of the at as of flow deflectors have different inclination directions; and inner cavities of the inclined pipes of the adjacent groups of the at least two groups of flow deflectors are in communication to form the flow deflecting channel.

13. The municipal sewage nitrogen removal treatment method according to claim 12, wherein the flow deflectors comprises three groups of flow deflectors; the inclined pipe at the bottom is obliquely arranged towards the direction of the water inlet pipeline, and the inclined pipe at the top is obliquely arranged towards the direction of the water outlet pipeline.

14. The municipal sewage nitrogen removal treatment method according to claim 12, wherein the radial section of the inclined pipe is a polygon, and an included angle between the axis of the inclined pipe and the horizontal plane is 30° to 60°.

15. The municipal sewage nitrogen removal treatment method according to claim 8, wherein when sludge concentration is higher than 100 mg/L, a quantity of reflux of the reflux pipeline is reduced by the reflux element, or the reflux pipe line stops working, and the sludge settles in the settling zone and is discharged.

16. The municipal sewage nitrogen removal treatment method according to claim 9, wherein when sludge concentration is higher than 100 mg/L, a quantity of reflux of the reflux pipeline is reduced by the reflux element, or the reflux pipe line stops working, and the sludge settles in the settling zone and is discharged.

17. The municipal sewage nitrogen removal treatment method according to claim 10, wherein when sludge concentration is higher than 100 mg/L, a quantity of reflux of the reflux pipeline is reduced by the reflux element, or the reflux pipe line stops working, and the sludge settles in the settling zone and is discharged.

18. The municipal sewage nitrogen removal treatment method according to claim 11, wherein when sludge concentration is higher than 100 mg/L, a quantity of reflux of the reflux pipeline is reduced by the reflux element, or the reflux pipe line stops working, and the sludge settles in the settling zone and is discharged.

19. The municipal sewage nitrogen removal treatment method according to claim 12, wherein when sludge concentration is higher than 100 mg/L, a quantity of reflux of the reflux pipeline is reduced by the reflux element, or the reflux pipe line stops working, and the sludge settles in the settling zone and is discharged.

20. The municipal sewage nitrogen removal treatment method according to claim 8, wherein when nitrobacteria increases until a nitritation process cannot operate, a quantity of reflux of the reflux pipeline is increased by the reflux element, such that the microorganisms adsorbed to the flow deflecting channels are shed off, and then the quantity of reflux is reduced by the reflux element to make the suspended sludge settle.

* * * * *